United States Patent [19]

Yoshida et al.

[11] Patent Number: 5,566,972
[45] Date of Patent: Oct. 22, 1996

[54] AIR BAG DEVICE

[75] Inventors: Ryoichi Yoshida; Noriyuki Kosugi; Yoshihiko Tanaka, all of Shiga; Eiji Yanagi, Kanagawa; Tadayuki Atoh, Shiga; Akira Kokeguchi, Shiga; Yoshihiko Minami, Shiga, all of Japan

[73] Assignee: Takata Corporation, Tokyo, Japan

[21] Appl. No.: 332,760

[22] Filed: Nov. 1, 1994

[30] Foreign Application Priority Data

Nov. 25, 1993 [JP] Japan ..................................... 5-294930

[51] Int. Cl.$^6$ ................................................. B60R 21/16
[52] U.S. Cl. ........................... 280/728.2; 280/743.1
[58] Field of Search ........................... 280/728 R, 728 A, 280/728 B, 731, 732, 739, 743 R, 730 A, 730 R, 728.1, 728.2, 728.3, 743.1, 730.1, 730.2

[56] References Cited

U.S. PATENT DOCUMENTS

| | | | |
|---|---|---|---|
| 3,810,654 | 5/1974 | DeBano et al. | 280/728 R |
| 4,153,273 | 5/1979 | Risko | 280/728 A |
| 4,332,398 | 6/1982 | Smith | 280/732 |
| 5,028,070 | 7/1991 | Bender | 280/741 |
| 5,100,168 | 3/1992 | Horiuchi et al. | 280/728 |
| 5,141,787 | 8/1992 | Yamamoto | 280/728 |
| 5,149,130 | 9/1992 | Wooley et al. | 280/743 R |
| 5,172,933 | 12/1992 | Strasser | 280/743 R |
| 5,186,489 | 2/1993 | Imai | 280/728.2 |
| 5,195,774 | 3/1993 | Morita | 280/731 |
| 5,226,671 | 7/1993 | Hill | 280/743.1 |
| 5,261,692 | 11/1993 | Kneip et al. | 280/743 R |
| 5,333,903 | 8/1994 | Eyrainer et al. | 280/743.1 |
| 5,378,019 | 1/1995 | Smith et al. | 280/743 R |
| 5,503,429 | 4/1996 | Wallner et al. | 280/743.1 |

FOREIGN PATENT DOCUMENTS

| | | |
|---|---|---|
| 0558762A1 | 9/1993 | European Pat. Off. . |
| 4009611 | 10/1991 | Germany ................. 280/728 R |
| 5-193432 | 8/1993 | Japan ...................... 280/728 A |
| 1457775 | 12/1976 | United Kingdom . |
| 2237247 | 5/1991 | United Kingdom . |

Primary Examiner—Paul N. Dickson
Attorney, Agent, or Firm—Kanesaka & Takeuchi

[57] ABSTRACT

An air bag for a passenger seat or a rear seat which is produced by easy sewing and is assembled into an air bag device easily is structured by superposing a lower panel and an upper panel and sewing up the peripheral portions of the panels. The lower panel is provided with an opening for an inflator and vent holes. The opening is provided with a cloth sewed on the outside of the periphery thereof. The rod-shaped inflator is inserted between the cloth and the opening. The both ends of the inflator are fixed to a casing.

6 Claims, 17 Drawing Sheets

AIR BAG DEVICE

FIELD OF THE INVENTION AND RELATED ART STATEMENT

The present invention relates to an air bag device for protecting an occupant in a passenger seat or a rear seat when a vehicle comes into collision and an air bag of the air bag device.

A conventional air bag for a passenger seat will be described with reference to FIG. 16.

The air bag 1 for a passenger seat has an opening 2 at the rear portion thereof for introducing gas from an inflator (not shown) which is disposed at the rear portion of the air bag 1. The air bag 1 is made of cloth and provided with flaps 3 which are made by impregnating synthetic resin or piling up and sewing reinforcing cloths on the periphery of the opening 2. The flaps 3 are provided with a plurality of through holes 4 for inserting bolts or rivets for connecting the air bag 1 to a container (not shown) of the air bag device.

The air bag 1 is formed by sewing the peripheries of side panels 7 on the periphery of a long center panel 6.

Each side panel is provided with a vent hole 5 previously. When the occupant plunges into the air bag 1, the vent holes 5 allow gas to flow out to absorb an impact applied to the occupant.

In the conventional air bag for a passenger seat as mentioned above, it takes many man-hours to sew the side panels 7 on the center panel 6 of a predetermined size because of a three-dimensional sewing.

That is, when each of the side panels 7 is sewed on the center panel 6, the peripheries of them are superposed with each other and sewed by a sewing machine. For superposing the peripheries, it is necessary to curve the center panel 6 along the periphery of the side panel 7. Therefore, it is difficult to superpose the periphery of the center panel 6 on each of the peripheries of the side panels 7. Because the center panel 6 and the side panels 7 are sewed up with curving the center panel 6, it is difficult and needs plenty of time and labor to sew them up.

When one of side panels is sewed on the center panel after the other side panel has been sewed on the center panel, it is particularly difficult to sew them up because the other side panel sewed up is bulky and is an obstacle to sew them up.

When the conventional air bag device is assembled, it is difficult to assemble the air bag into the casing because the flaps of the air bag 1 are fixed to the casing with bolts or rivets.

OBJECT AND SUMMARY OF THE INVENTION

It is therefore an object of the present invention to provide an air bag which can be made easily.

It is another object of the present invention to provide an air bag device which can be assembled easily.

An air bag according to the present invention relates to an air bag of an air bag device for a passenger seat or a rear seat and comprises two panels wherein the panels are superposed each with other and connected at the peripheral portions thereof, and one of the panels being provided with an opening for receiving gas from an inflator and with a retaining member for holding the inflator.

The retaining member is preferably made of synthetic resin molding or metal molding and connected to the one of the panels.

The retaining member may be made of cloth or sheet.

The retaining member may be covered with a protective material to protect the retaining member from heat or gas from the inflator, the protective material covering the retaining member along the inner surface thereof.

An air bag of an air bag device according to another embodiment comprises two panels wherein the panels are superposed and connected at the peripheral portions thereof, and one of the panels being provided with two openings into which a rod-shaped inflator is inserted.

The inner surface of the one of the panels may be covered with a protective material to protect the one of the panels from heat or gas from the inflator, the protective material covering the inner surface about the openings.

The panels are preferably made of cloth and connected with each other by sewing.

An air bag device of the present invention has a casing in which an air bag and an inflator are accommodated wherein the inflator is fixed to the casing, the air bag being one of the above mentioned air bags, and the inflator being inserted inside the retaining member.

An air bag device according to another embodiment has a casing in which an air bag and a cylindrical inflator are accommodated wherein the inflator is fixed to the casing, the inflator being inserted partly inside the air bag, and the both ends of the inflator extend from the air bag through the opening.

The air bag of the present invention can be made quite easily because two panels such as cloths are sewed up at the peripheries thereof in a state that the panels are superposed with each other.

The inflator is inserted into the retaining member so that the rear portion of the air bag is held by the inflator, or the inflator pierces inside of the air bag so that the rear portion of the air bag is held by the inflator. Therefore, it eliminates fixing the air bag to the casing directly.

DETAILED DESCRIPTION OF THE PREFERRED EMBODIMENT

Figure 7:
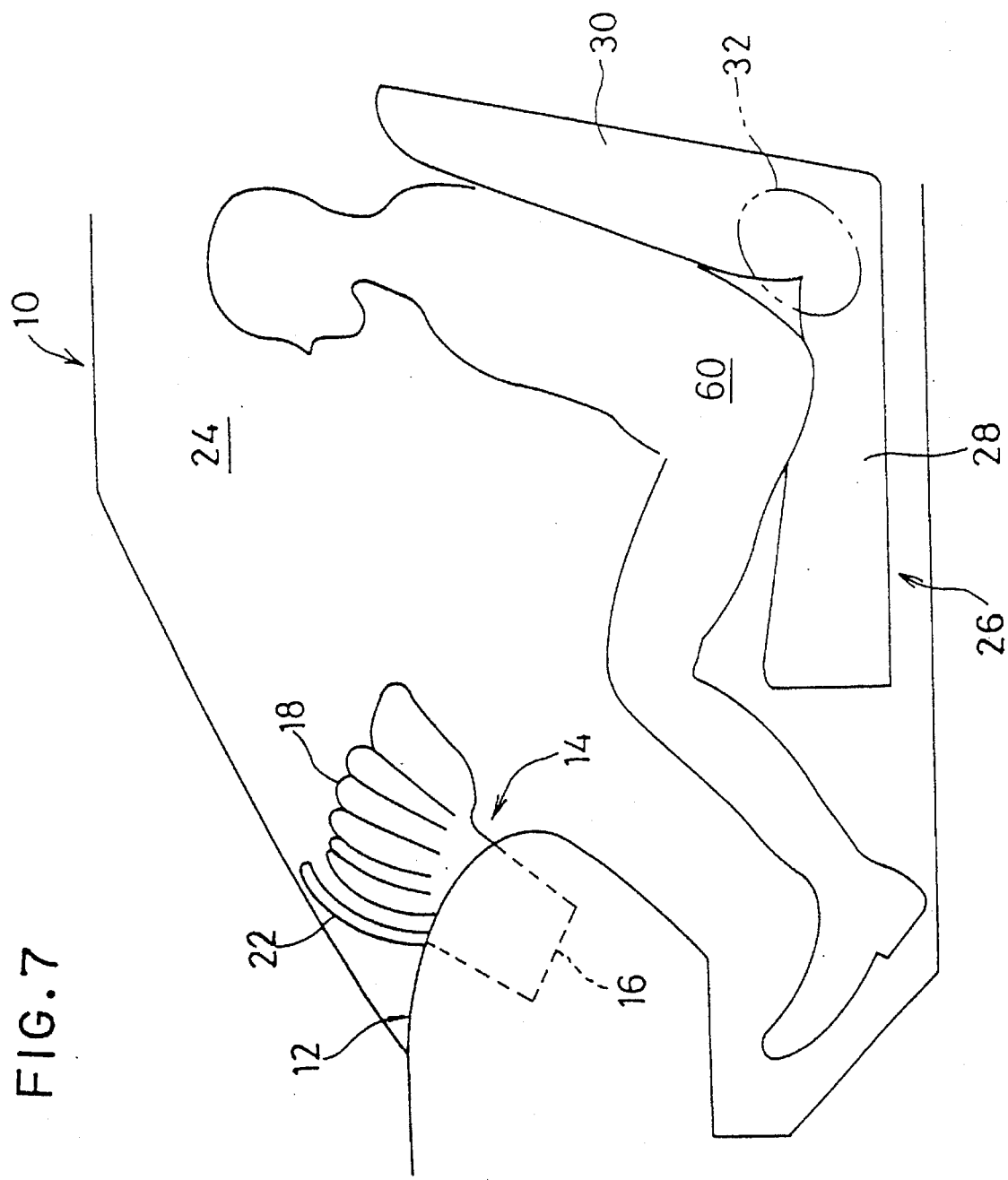
FIG. 7 is a side view of the inside of a vehicle mounted with an air bag device according to the embodiment.
Figure 8:
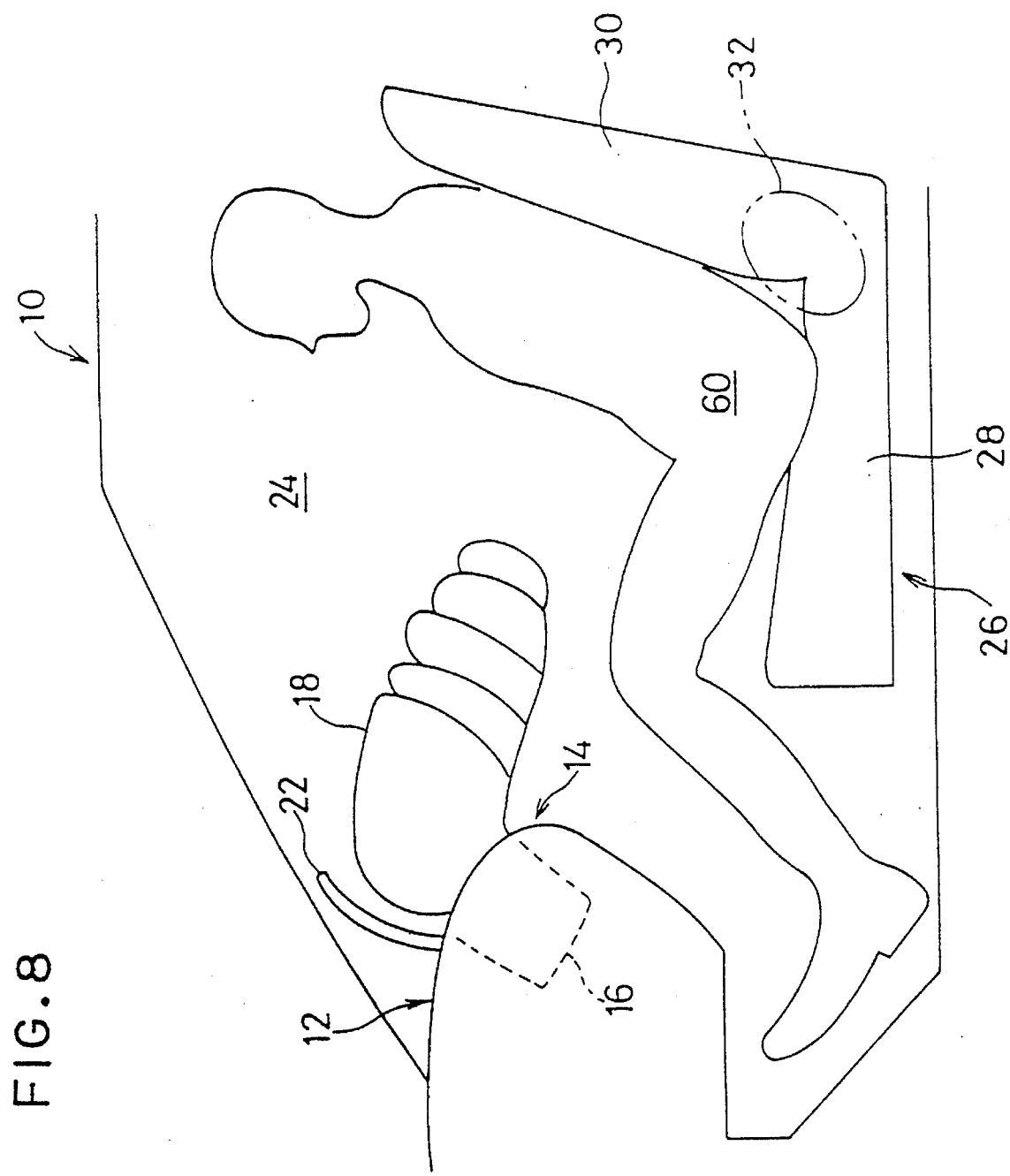
FIG. 8 is a side view of the inside of the vehicle mounted with the air bag device according to the embodiment.

Embodiments will now be described with reference to the attached drawings. FIGS. 1–6 are explanatory views of an air bag and an air bag device according to an embodiment of the present invention and FIGS. 7–9 are side views showing the inside of a vehicle mounted with an air bag device according to the embodiment.

Figure 4:
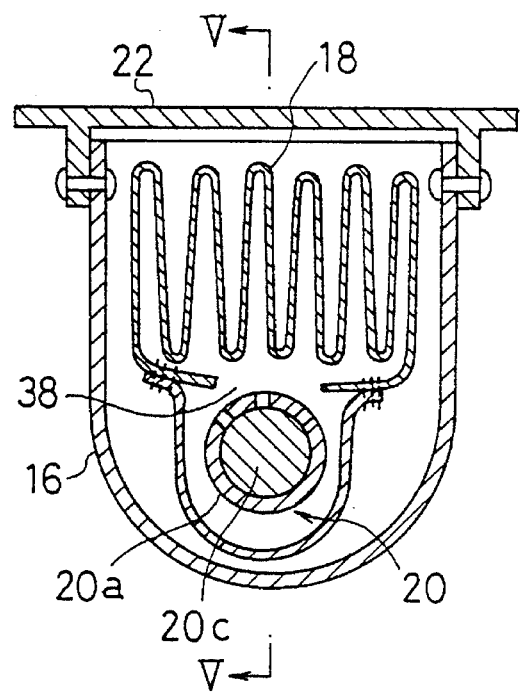
FIG. 4 is a section view of an air bag device according to the embodiment.
Figure 5:
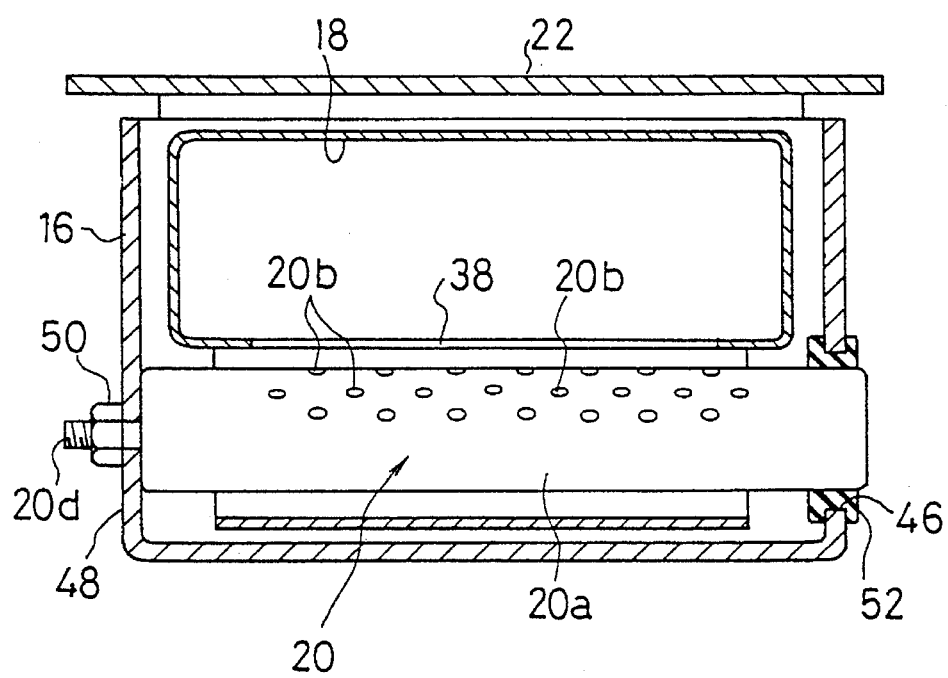
FIG. 5 is a section view taken along the line V—V of FIG. 4.
Figure 9:
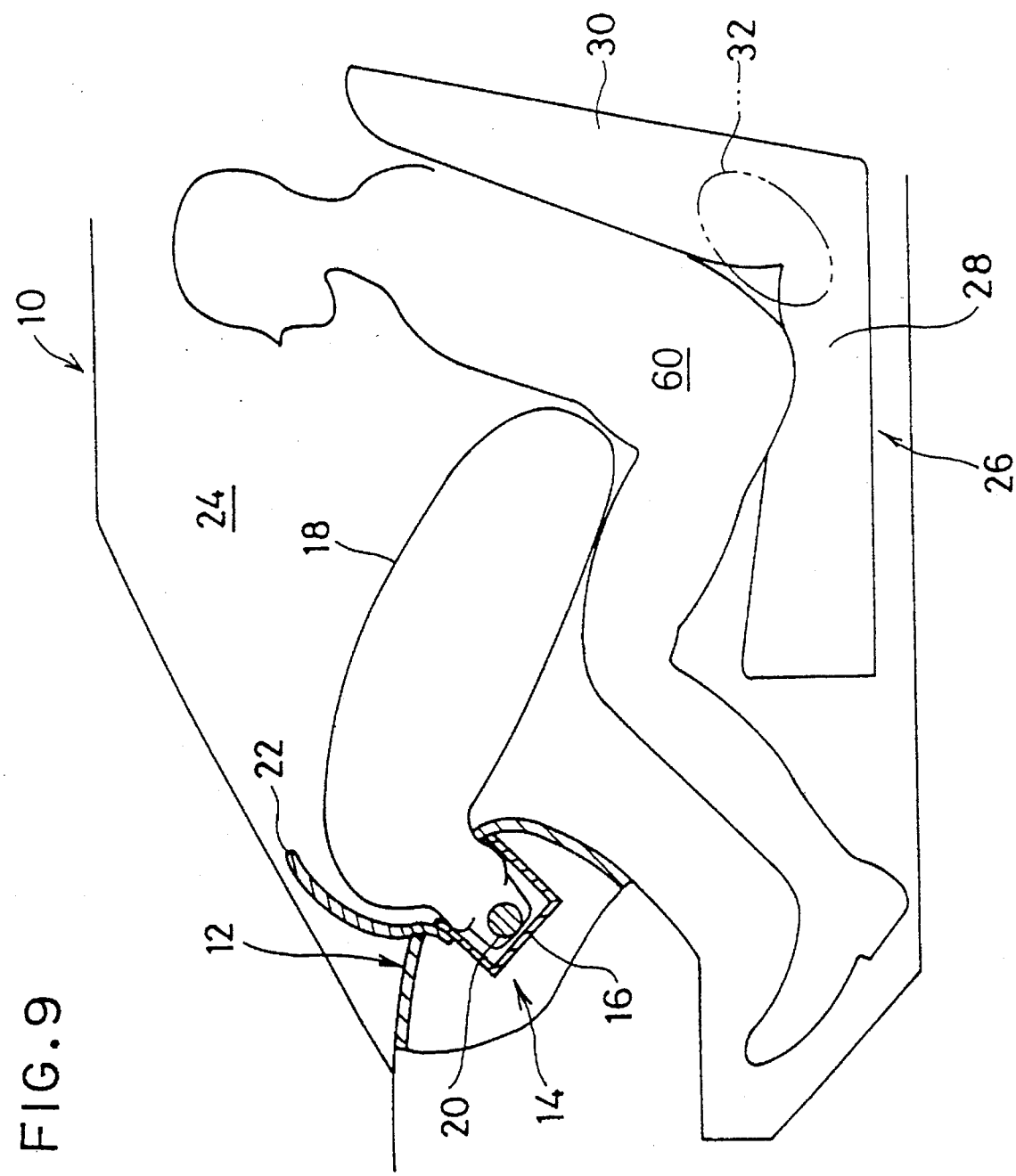
FIG. 9 is a side view of the inside of the vehicle mounted with the air bag device according to the embodiment.

As shown in FIG. 9, the air bag device 14 for a passenger seat is mounted in an instrument panel 12 of the vehicle 10. The air bag device 14 comprises a casing 16, an air bag 18 folded and accommodated in the casing 16, an inflator 20 for generating gas for deploying the air bag 18, and a lid 22 covering the casing 16 as shown in FIGS. 4 and 5. The lid 22 has one side connected to the casing 16 to allow the lid to rotate toward the cabin 24 of the vehicle. The other side of the lid 22 opposite to the one side is connected to the casing 16 such that it becomes apart from the casing 16 upon the pushing force of the air bag 18 when the inflator 20 operates to deploy the air bag 18.

The air bag 18 used for this embodiment is formed in an envelop shape by sewing up two sheets of cloth which are a lower panel 34 at the lower side thereof and an upper panel 36 at the upper side thereof, as shown in FIGS. 1–6. The air bag 18 is structured to extend toward the portion about the corner 32 where a seat cushion 28 and a seat back 30 of a seat 26 in the vehicle 10 cross each other.

The lower panel 34 is provided with an opening 38 for introducing gas from the inflator 20 and vent holes 40. The opening 38 is provided with a cloth 42 sewed on the periphery thereof. The inflator is inserted between the cloth 42 and the opening 38.

The cloth 42 is rectangular and disposed on the opening 38 to cover the opening 38 from the outside. The side edge of the cloth 42 are sewed on the lower panel 34 by threads 44.

Figure 1:
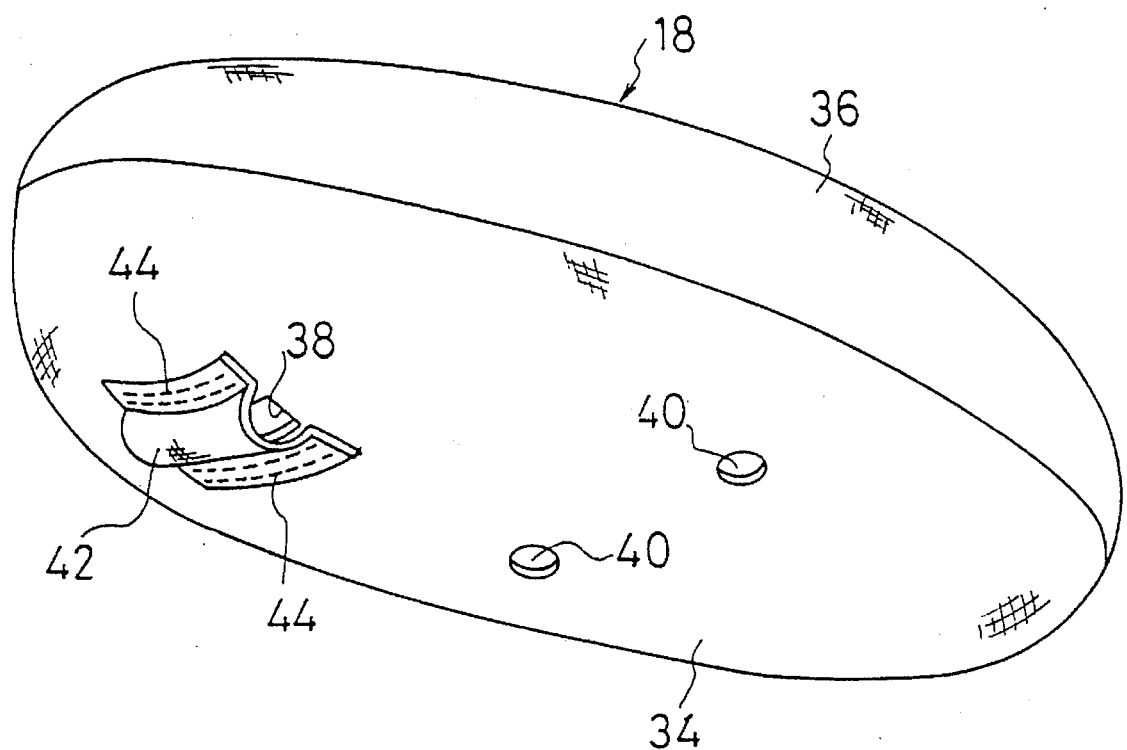
FIG. 1 is a perspective view of an air bag 18 according to an embodiment of the present invention.
Figure 2:
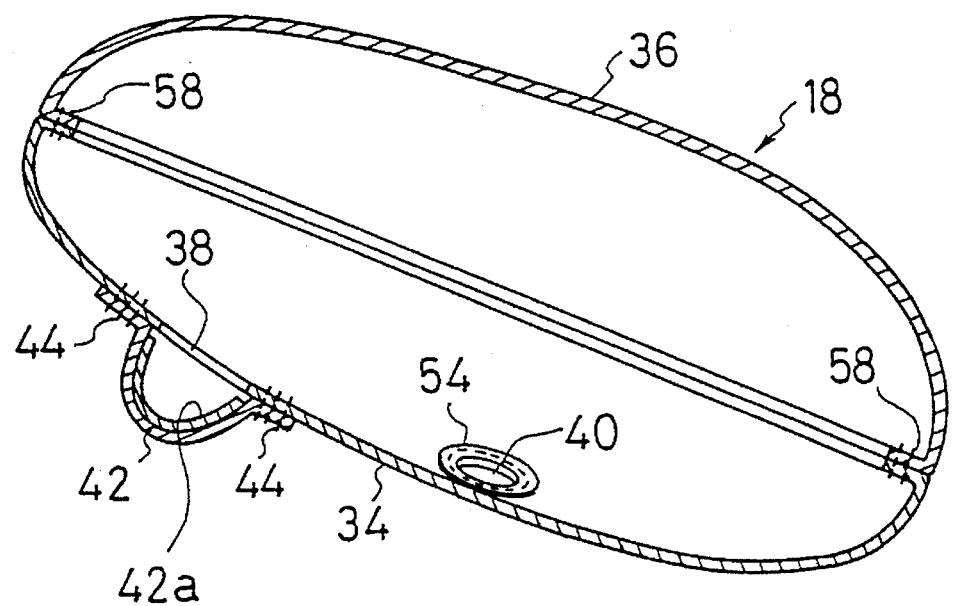
FIG. 2 is a section view of the air bag 18 according to the embodiment.

As shown in FIG. 2, an inner surface of the cloth 42 is provided with a heat-resistant coating (for example, silicone resin coating) 42a.

The inflator 20 comprises a cylindrical casing 20a, outlets 20b disposed in the casing 20a for jetting gas, propellant 20c filled in the casing 20a for generating the gas, and screw 20d disposed to the tip of the casing 20a.

The casing 16 has an opening 46, disposed in one side of the casing 16, into which the inflator 20 is inserted. The casing 16 has an opening 48, disposed in the other side of the casing 16, into the which the screw 20d is inserted.

Figure 3:
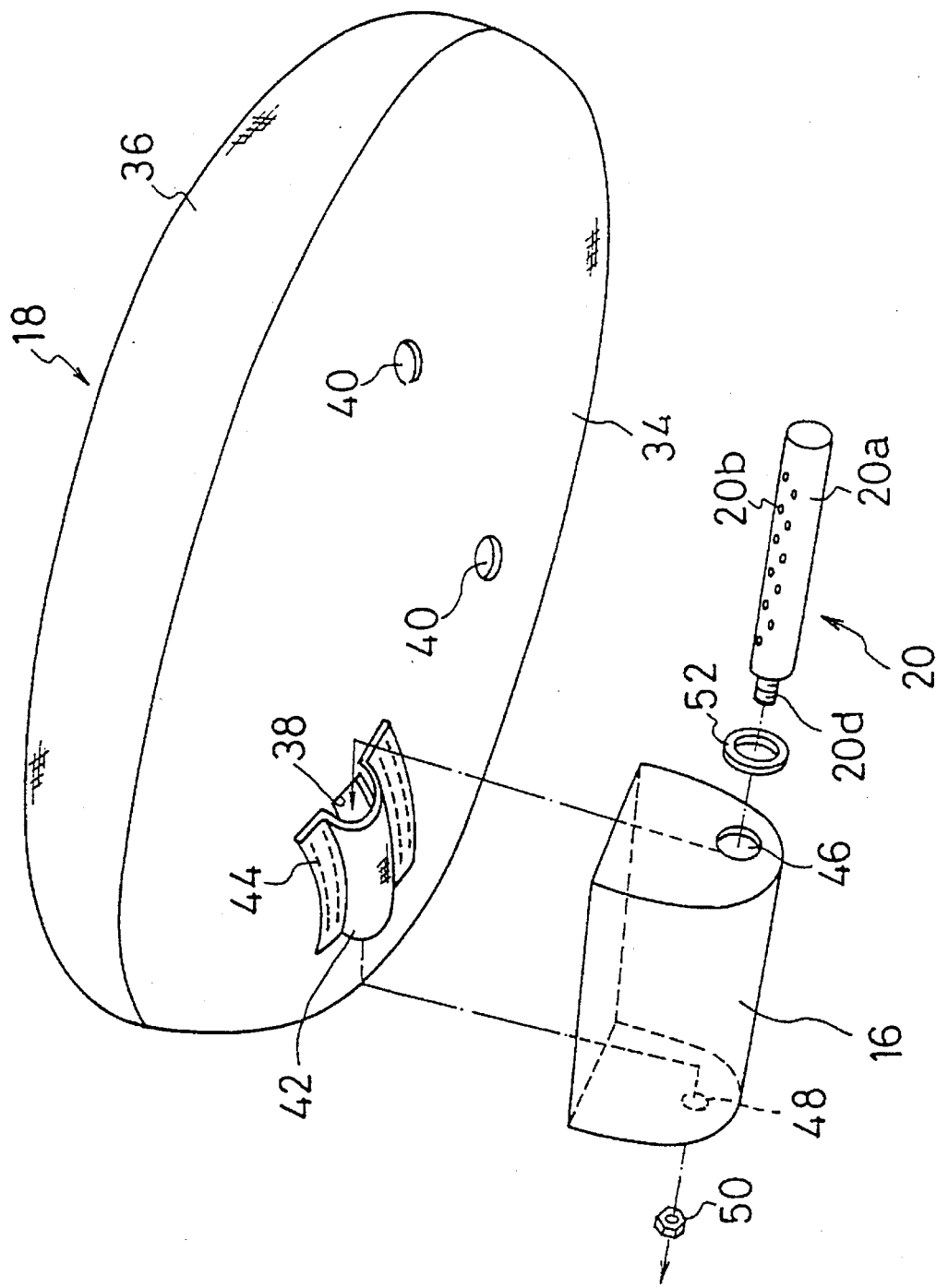
FIG. 3 is an exploded perspective view of the air bag according to the embodiment.

The inflator 20 is inserted into inside of the cloth 42 from the opening 46 as shown in FIGS. 3–5. The screw 20d is inserted into the opening 48. A nut 50 is screwed into the screw 20d. Therefore, the inflator 20 is fixed to the casing 16. A gasket 52 for preventing gas leakage is mounted on the inner periphery of the opening 46.

As shown in FIG. 3, panels 34 and 36 are each formed in a shape extending long in the longitudinal direction of the vehicle 10. The opening 38 in the air bag 18 is positioned near the front of the vehicle 10. The periphery of the vent hole 40 is provided with a circular patch cross 54 by sewing.

Figure 6:
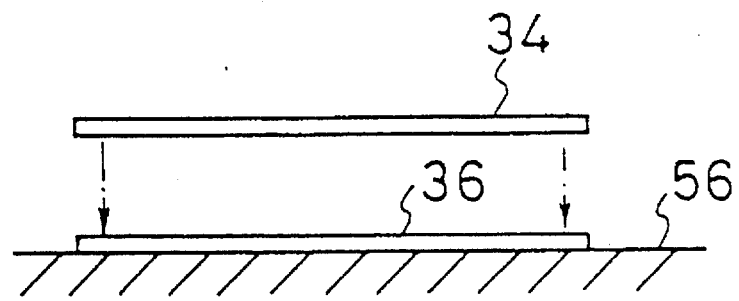
FIG. 6 is a view for explaining a sewing method of the air bag according to the embodiment.

The panels 34 and 36 are superposed each other on a work bench 56 of a sewing machine as shown in FIG. 6. The peripheries of the panels 34 and 36 are sewed up securely by a thread 58 (FIG. 2).

In this manner, it is quite easy to sew them up because the two panels 34 and 36 are sewed in a state that the panels 34 and 36 are superposed on the flat work bench 56 as mentioned above.

The panels 34 and 36 are preferably structured so as to cross the textures of the panels obliquely from each other.

When the vehicle 10 mounted with the air bag device 14 as structured above comes into collision, the inflator 20 jets out gas to deploy the air bag 18. The lid 22 is pushed by the air bag 18 deploying and opens toward the cabin 24 of the vehicle. Therefore, the air bag 18 is introduced into the cabin 24 of the vehicle, as shown in FIG. 7. The air bag 18 extends toward the portion about the corner 32 where the seat cushion 28 and the seat back 30 cross with each other, as shown in FIG. 8. The air bag 18 finally touches the waist 60 of the occupant to restrain the waist 60 of the occupant, as shown in FIG. 9.

As a result of various kinds of experiments, it is proved that the air bag 18 restraining the waist 60 can protect enough the occupant as well as an air bag deploying widely in front of the upper part, such as a part from the chest to the head, of the occupant. In addition, the air bag device 14 has an effect of restricting a forward movement of the lower part of the occupant without a seat belt when the vehicle comes into collision.

The air bag 18 of the air bag device 14 has a small volume as compared with a conventional air bag which deploys widely in front of the upper part of the occupant. Therefore, it takes a quite short time to deploy the air bag 18 completely. Furthermore, it is possible to reduce the capacity of the inflator 20.

According to the air bag device 14, it is not necessary to rivet or bolt the air bag 18 to the casing 16, so that the air bag device 14 can be assembled quite easily in a short time.

When the air bag 18 receives, a large force by the gas from the inflator 20 in a direction of introducing into the cabin when the air bag 18 deploys, the air bag 18 is securely fastened to the casing 16 because the cloth 42 is turned and positioned at the back of the inflator 20.

Figure 10:
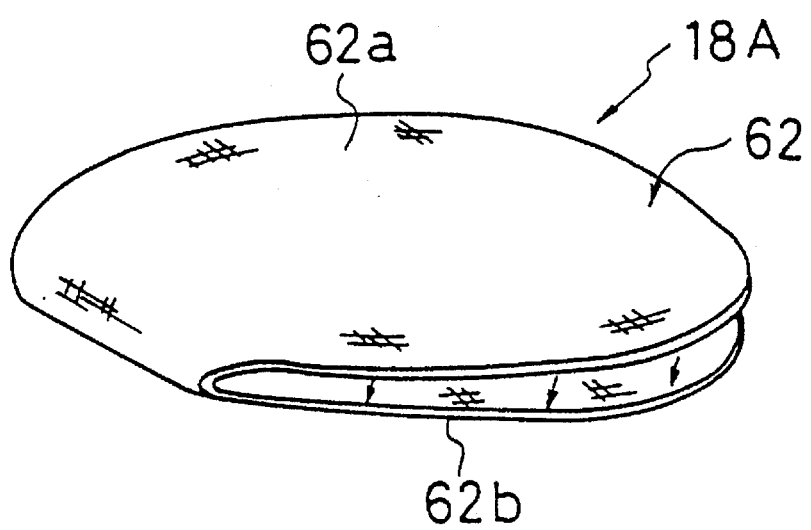
FIG. 10 is a perspective view showing a production method of an air bag 18A according to another embodiment.

Although the air bag 18 made by sewing up two panels 34 and 36 is employed in the above embodiment, an air bag according to the present invention may be an air bag 18A shown in FIG. 10 which is structured by folding one sheet of panel 62 in two and sewing up the peripheral portions of an upper panel 62a and a lower panel 62b.

Figure 11:
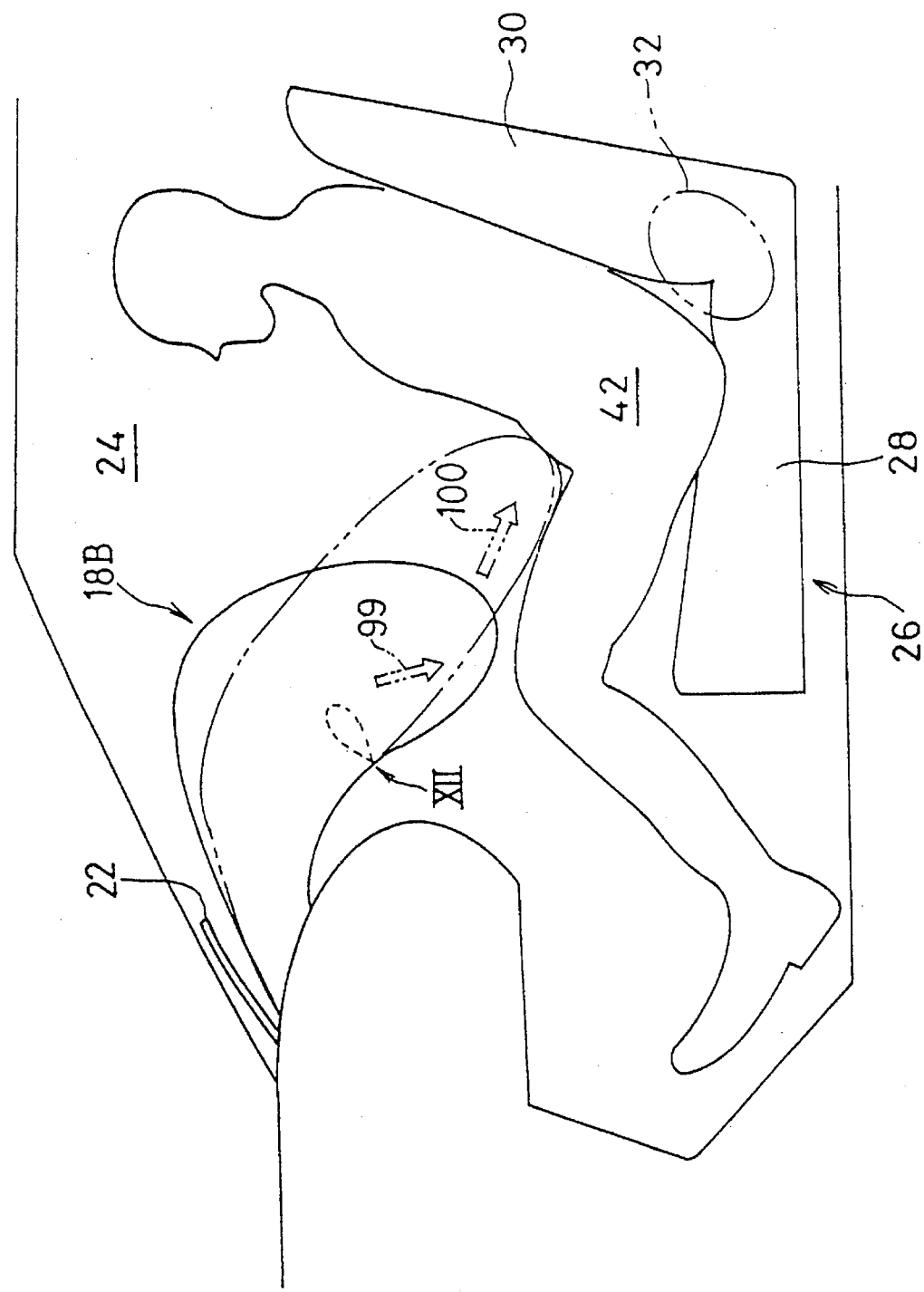
FIG. 11 is a side view of the inside of a vehicle mounted with an air bag 18B according to another embodiment.
Figure 12:
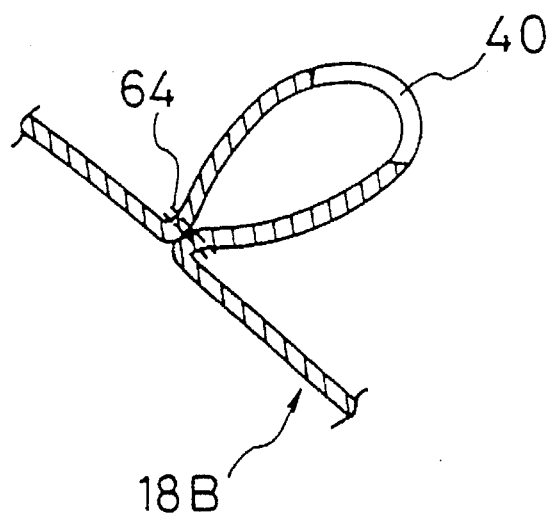
FIG. 12 is an enlarged section view of a portion XII of FIG. 11.

FIG. 11 is a side view of the inside of a vehicle mounted with an air bag device according to another embodiment of the present invention and FIG. 12 is an enlarged section view of a portion XII of FIG. 11.

In the air bag 18B used for this embodiment, one part of the lower side surface is lapped and sewed up with a thread 64. The thread 64 has characteristics to snap when a tensile force applied to the thread 64 exceeds a predetermined value due to an inner pressure of the air bag 18B exceeding a predetermined value.

In this embodiment, side portions with said vent hole in between are sewed up with the thread 64. That is, the vent hole 40 is in a closed state.

In the air bag device as structured above, the air bag 18B is deployed by an operation of the inflator. The thread 64 does not snap until the air bag 18B becomes in an intermediate deployed state as shown in FIG. 11. After the intermediate deployed state, the inner pressure in the air bag 18 B is increased so that the tensile force applied to the thread 64 exceeds the strength of the thread 64, so that the thread 64 snaps. The tip portion of the air bag 18B extends toward the seat cushion 28 first as shown by the arrow 99 and, by a snap of the thread 64, the air bag 18B then extends toward the portion about the corner 32 where the seat cushion 28 and the seat back 30 cross each other, as shown by the arrow 100. The vent hole 40 is opened by the snap of the thread 64. In this embodiment, the vent hole 40 is closed until the thread 64 snaps so as to prevent the gas leakage through the vent hole 40.

Figure 13:
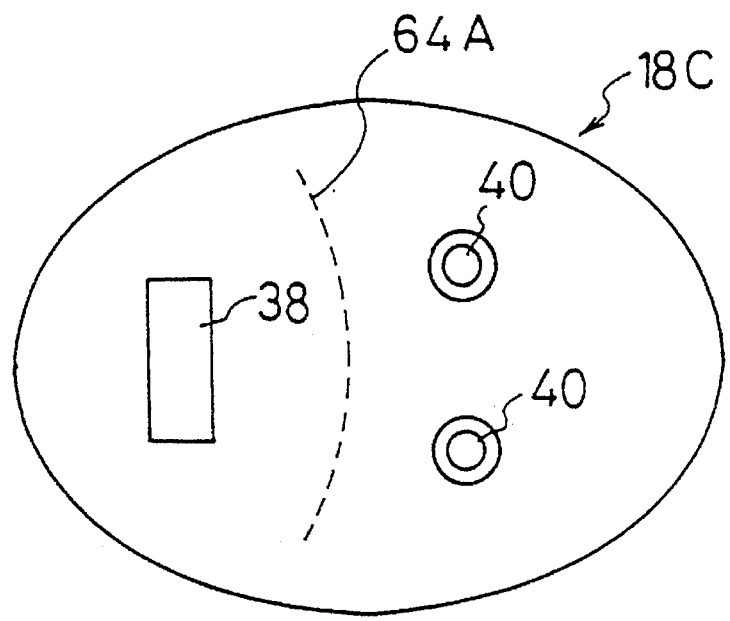
FIG. 13 is a bottom view of an air bag 18C according to another embodiment of the present invention.

A seam of a thread 64A may be disposed not only at the side portion, with the vent hole 40 in between of the lower panel but also at any place in an air bag 18C as shown in FIG. 13.

The air bag according to the present invention can be used for a top-mount-type air bag device or a mid-mount-type air bag device by changing the position of the opening 38 for an inflator.

Figure 14:
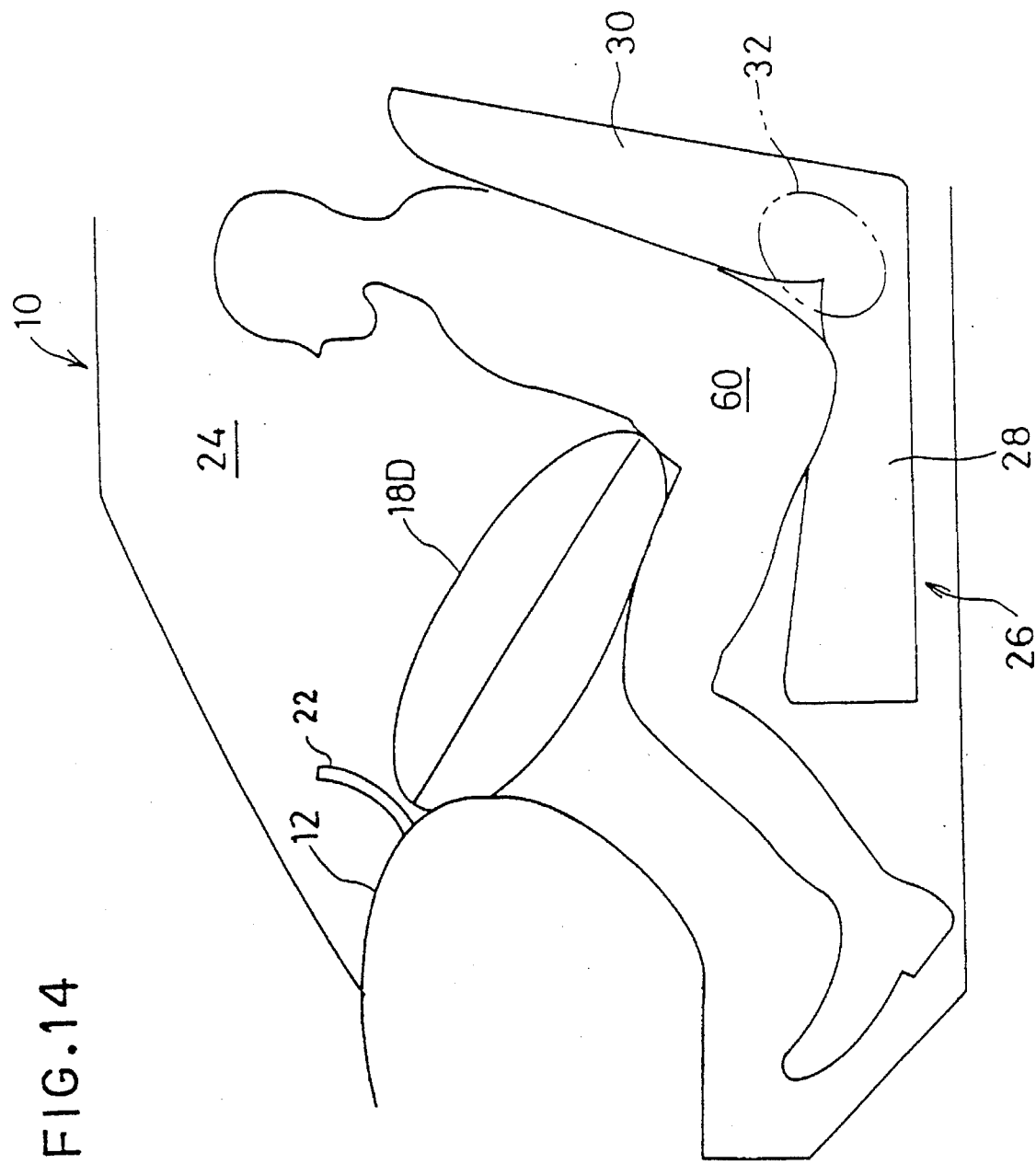
FIG. 14 is a side view of the inside of a vehicle mounted with an air bag 18D according to further another embodiment.

The top-mount-type air bag device is mounted in the upper part of the instrument panel. The air bag devices as shown in FIGS. 7–9 and FIG. 11 fall within this type, The mid-mount-type air bag device is, as shown in FIG. 14, mounted in the middle part in the vertical direction of the instrument panel 12. In FIG. 14, the numeral 18D designates an air bag. The other numerals designate same corresponding parts as mentioned above.

Figure 15:
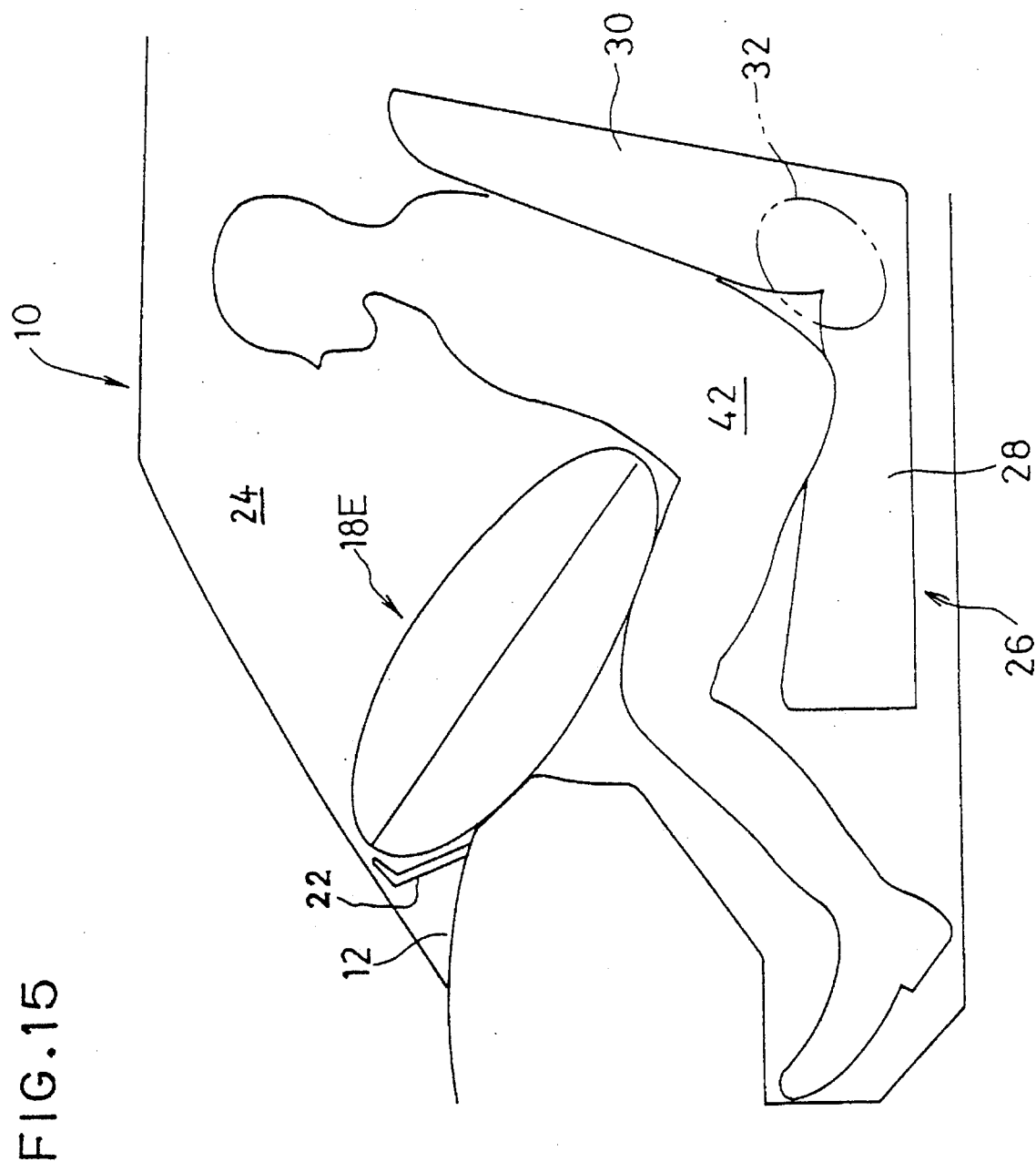
FIG. 15 is a side view of the inside of a vehicle mounted with an air bag 18E according to a different embodiment of the present invention.
Figure 16:
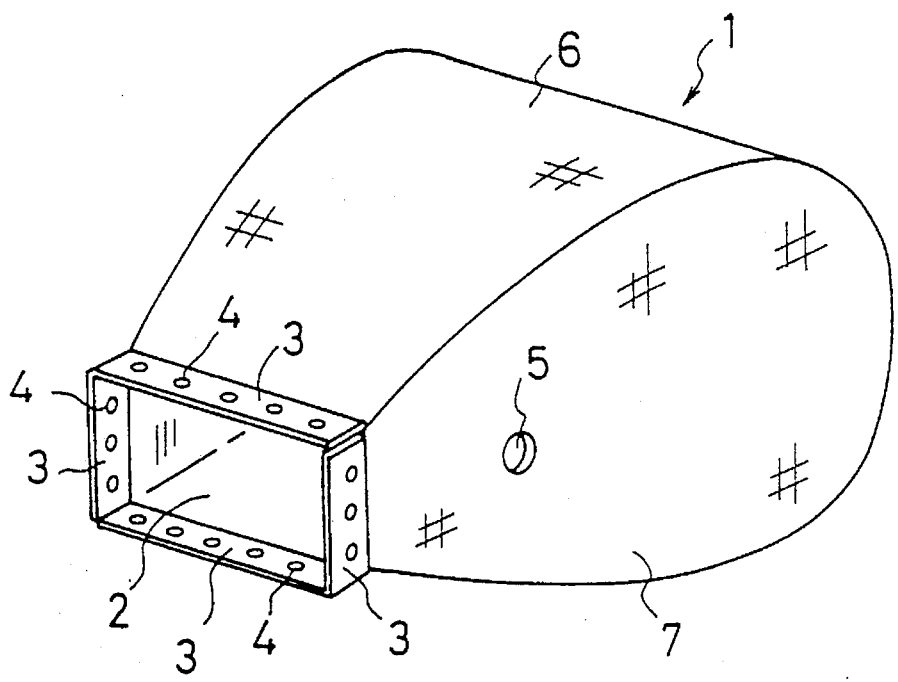
FIG. 16 is a perspective view of a conventional air bag for a passenger seat.
Figure 17:
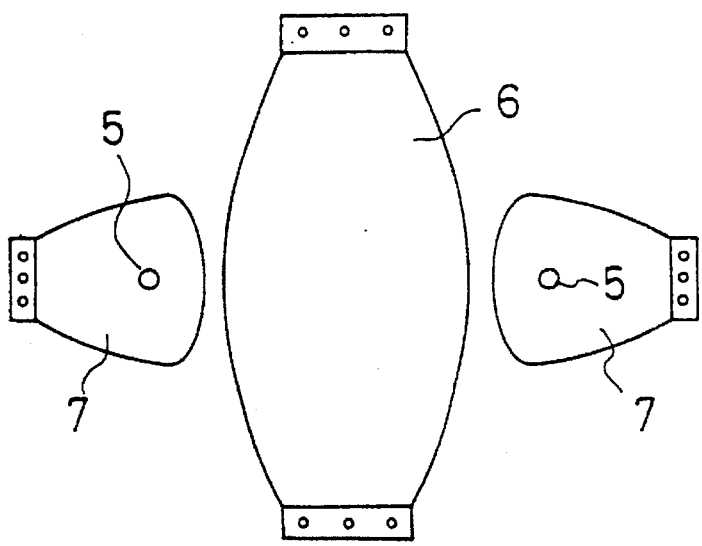
FIG. 17 is an exploded view showing the structure of the conventional air bag for a passenger seat.

By choosing a position of the opening for an inflator, the air bag according to the present invention can be mounted on any vehicle having an instrument panel of different forms or a body of different sizes without changing the outer size of the air bag. FIG. 15 shows an example that the air bag 18E is mounted on a small vehicle having an angular-shaped instrument panel 12. The other numerals in FIG. 15 designate same corresponding parts as mentioned above.

Though the air bag device is mounted on the instrument-panel 12 in the above mentioned embodiments, the air bag device may be mounted on the seat back 30 for protecting an occupant in a rear seat.

Figure 18:
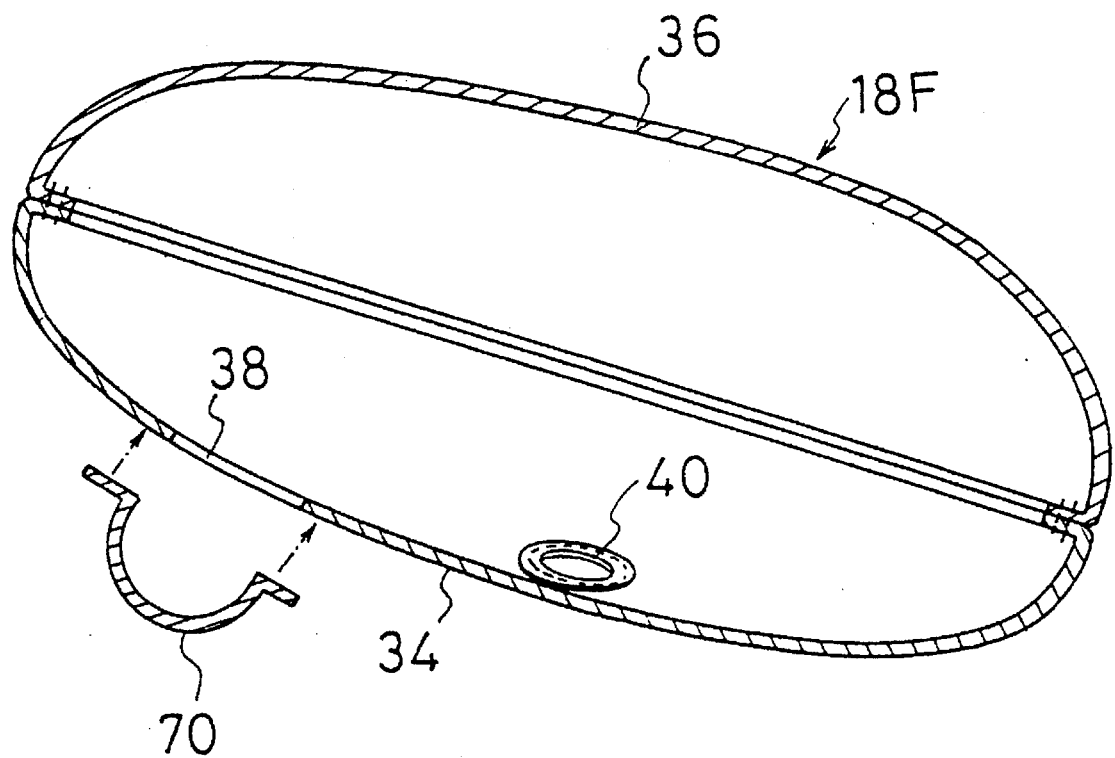
FIG. 18 is a section view showing an air bag 18F according to a different embodiment of the present invention.

According to the present invention, as shown in FIG. 18, a retaining member 70 made of synthetic resin molding or metal may be connected to the lower panel 34 of an air bag 18F. When the retaining member is made of synthetic resin, the retaining member is connected to the lower panel 34 by heat sealing or welding.

Figure 19:
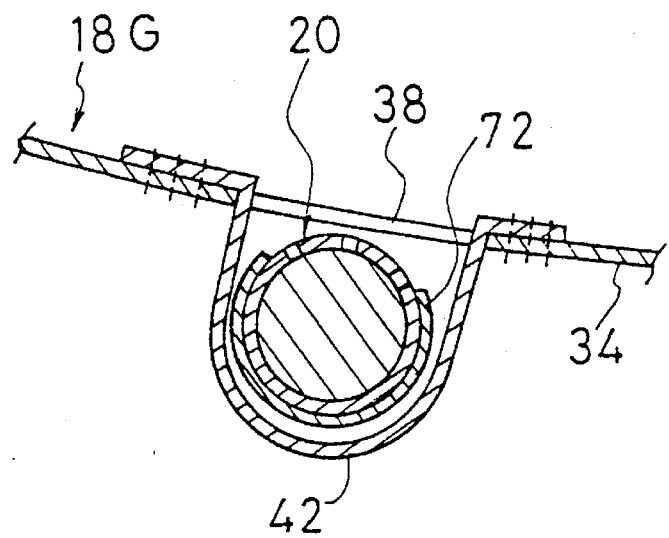
FIG. 19 is a section view showing a main part of an air bag 18G according to a different embodiment of the present invention.

According to the present invention, as shown in FIG. 19, the side portions of the cloth 42 or a retaining member may be disposed inside the air bag 18G through the opening 38.

According to the present invention, as shown in FIG. 19, heat insulating material may be provided on the outer surface of the inflator 20.

Figure 20:
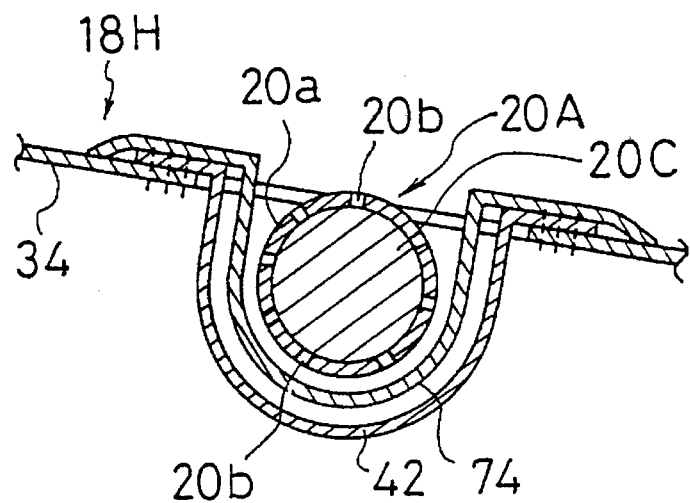
FIG. 20 is a section view showing a main part of an air bag 18H according to a different embodiment of the present invention.

According to the present invention, as an air bag 18H of FIG. 20, heat-resistant cloth or sheet 74 may be provided by superposing it on the cloth 42. In this case, the sheet 74 may be sewed together with the cloth on the lower panel 34 or may be glued the cloth 42 after the cloth 42 is sewed on the lower panel 34.

According to the present invention, as shown in FIG. 20, the gas outlet 20b may be disposed all around the inflator 20A to jet gas in all radial directions of the inflator 20A.

Figure 21:
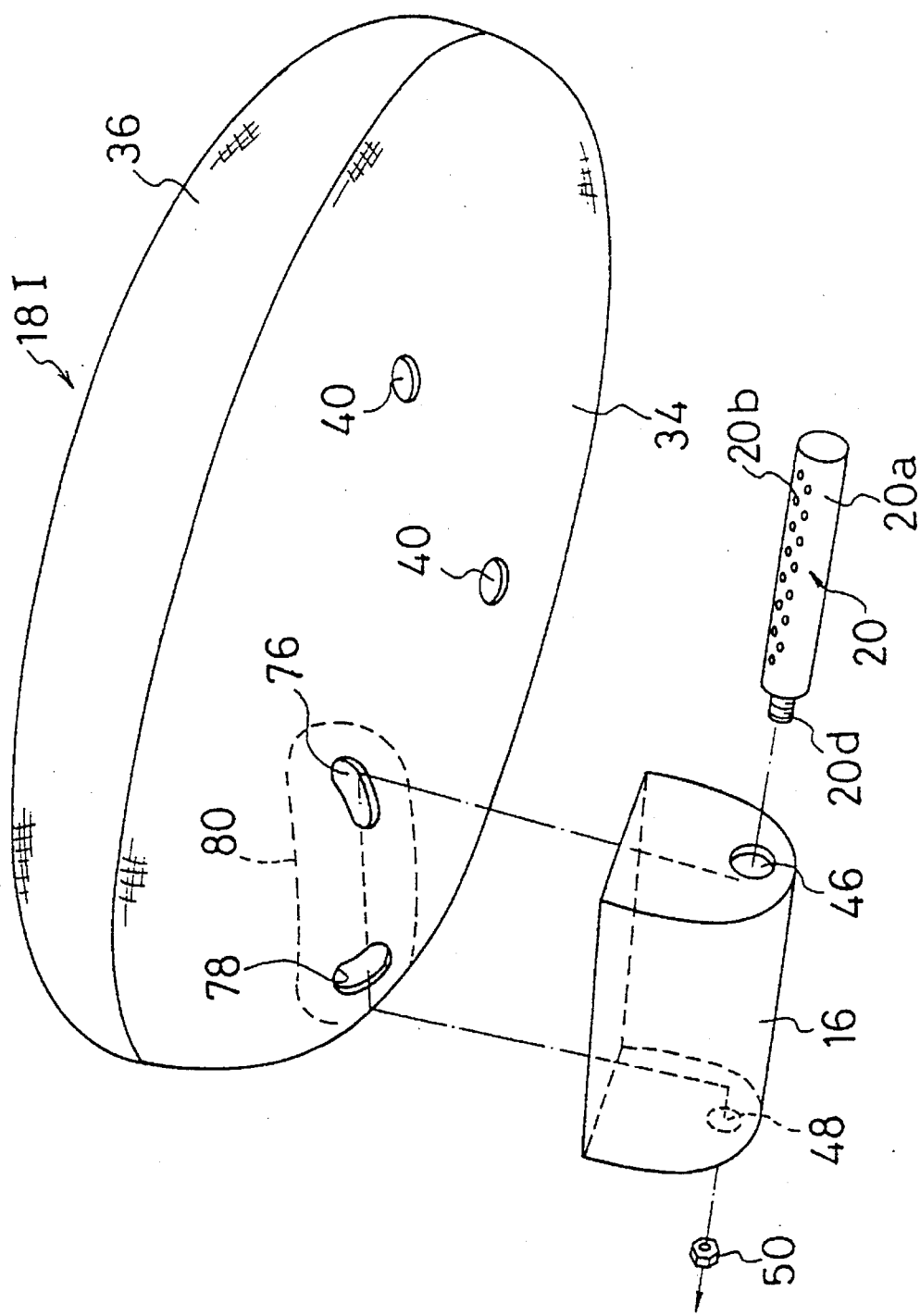
FIG. 21 is an exploded perspective view of an air bag 18I according to a further different embodiment of the present invention.
Figure 22:
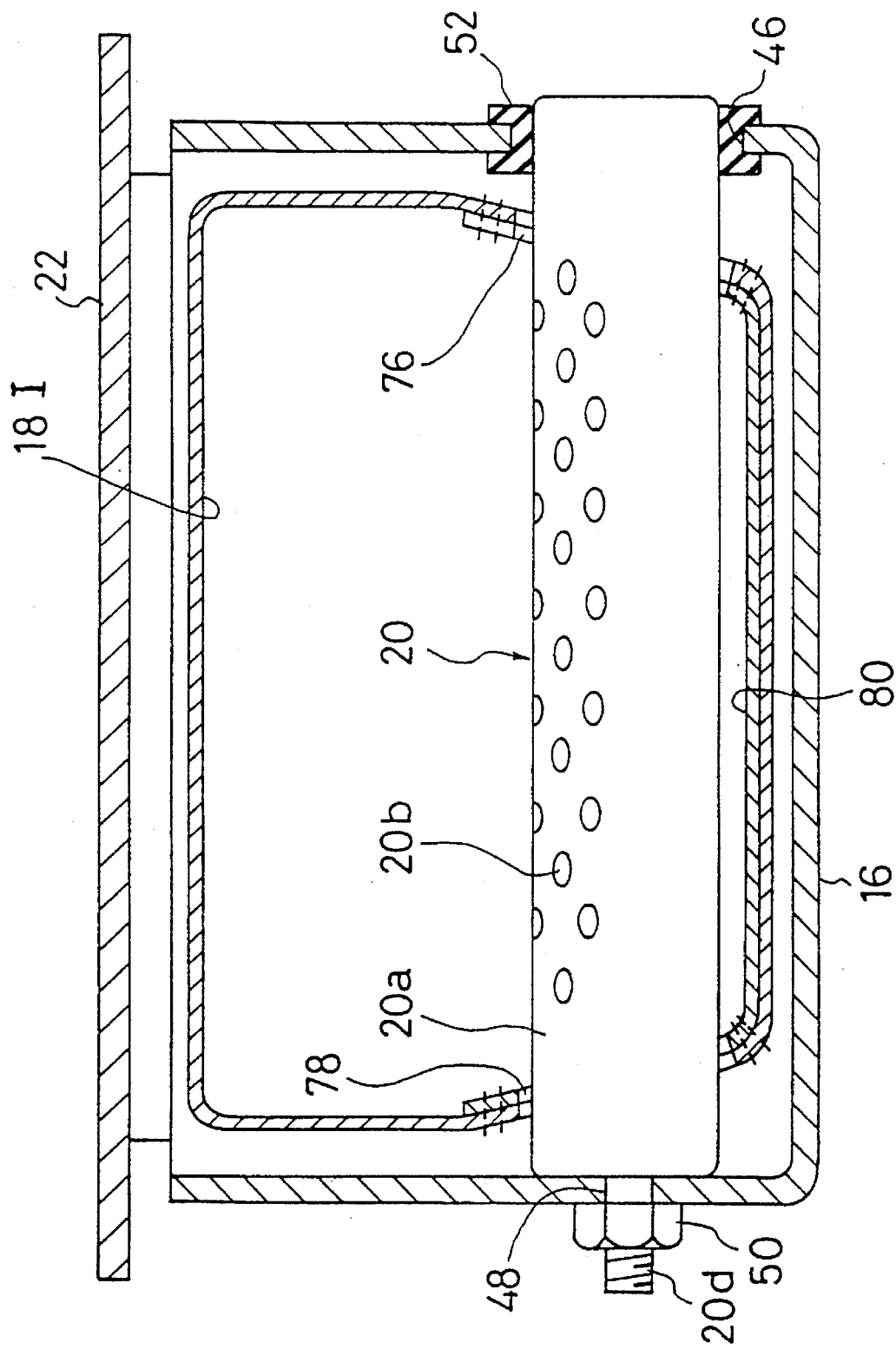
FIG. 22 is a section view of an air bag device equipped with the air bag 18I of FIG. 21.

FIG. 21 is a perspective view of an air bag and an air bag device according to a further different embodiment of the present invention; and FIG. 22 is a section view of the air bag device.

In this embodiment, the air bag 18I is provided with two openings 76 and 78. The inflator 20 is inserted into the air bag 18I through the opening 76 at one side and pass through the opening 78 at the other side of the air bag 18I. The inner surface of the air bag 18I is provided with a heat-resistant coating 80 around the openings 76 and 78.

A heat-resistant cloth or sheet may be sewed or glued instead of providing the heat-resistant coating. The other components of the air bag device shown in FIGS. 21 and 22 are the that of the air bag shown in FIGS. 1 and 5. The same numerals of FIGS. 21 and 22 designate the same corresponding parts.

According to this embodiment also, it is easy to mount the air bag to the casing.

The panels are made of cloths in the above mentioned embodiments, but the panels may be instead made of synthetic resin sheet.

The upper panel and the lower panel are connected by sewing up, but these panels may be connected by adhesion or heat sealing instead.

As mentioned above, according to the present invention, an air bag can be made easily and the production cost of an air bag device for a passenger seat or an air bag device for a rear seat can be remarkably reduced.

In the air bag and air bag device according to the present invention, the air bag is mounted quite easily to the casing.

According to the present invention, it is possible to protect the cloth or the like from heat or 9as from the inflator.

The air bag of the present invention is made easily by sewing.

What is claimed is:

1. An air bag attached to an air bag device having a casing and an inflator situated inside the casing, comprising:

a panel member for constituting the air bag and having an elongated opening for allowing gas to flow therethrough from the inflator to inflate the panel member upon actuation of the inflator, and a one piece retaining member having a main portion and two side portions on opposite sides of the main portion, said side portions being fixed to the panel member at side areas of the elongated opening, said main portion projecting outwardly from the panel member and forming an elongated hole with side openings between the panel member and the retaining member, said main portion facing the elongated opening so that when the air bag is assembled with the air bag device, only the inflator is located in the elongated hole while projecting outwardly through the side openings and faces the elongated opening to thereby easily attach the panel member to the inflator.

2. An air bag according to claim 1, further comprising a protective material to be disposed between the inflator and the main portion of the retaining member to protect the retaining member from heat when the inflator is actuated.

3. An air bag according to claim 2, wherein said retaining member is made of one material selected from a group consisting of cloth, resin and metal.

4. An air bag according to claim 2, wherein said protective material is a heat resisting cloth situated inside the retaining member and fixed to the panel member.

5. An air bag according to claim 2, wherein said protective material is a heat insulating material fixed on an outer surface of the inflator.

6. An air bag attached to an air bag device having a casing and an inflator situated inside the casing, comprising:

a panel member for constituting the air bag and having a lower portion, said lower portion having two openings spaced apart from each other at a distance shorter than a longitudinal length of the inflator, both openings having sizes greater than a diameter of the inflator to allow the inflator to pass through the openings, and a protective material situated inside the lower portion of the panel member at an area around and between the two openings to protect the panel member from heat when the inflator is actuated, said air bag being assembled with the air bag device such that only the inflator is located in the lower portion of the panel member while end portions of the inflator project outwardly through the openings and are fixed to the casing to thereby easily and securely attach the panel member to the inflator.

* * * * *